United States Patent [19]
Lee et al.

[11] Patent Number: 5,316,998
[45] Date of Patent: May 31, 1994

[54] HCL ADSORBENT AND METHOD FOR MAKING AND USING SAME

[75] Inventors: John S. Lee, Baton Rouge, La.; Michael J. Pearson, Castro Valley, Calif.

[73] Assignee: Discovery Chemicals, Inc., Port Allen, La.

[21] Appl. No.: 878,857

[22] Filed: May 5, 1992

[51] Int. Cl.$^5$ .......... B01J 20/08; B01J 20/04; B01D 53/04; C01B 7/00
[52] U.S. Cl. .......... 502/415; 95/131; 210/679; 252/190; 423/240 S
[58] Field of Search .......... 502/415, 344; 252/190, 252/189

[56] References Cited

U.S. PATENT DOCUMENTS

| | | | |
|---|---|---|---|
| 2,915,365 | 12/1959 | Saussol | 55/261 |
| 4,053,558 | 10/1977 | Campbell | 423/240 R |
| 4,092,403 | 5/1978 | Rectenwald et al. | 423/240 S |
| 4,375,571 | 3/1983 | Hart et al. | 502/344 |
| 4,639,259 | 1/1987 | Pearson | 252/190 |
| 4,762,537 | 8/1988 | Fleming et al. | 502/64 |

Primary Examiner—Paul E. Konopka
Attorney, Agent, or Firm—Browning, Bushman, Anderson & Brookhart

[57] ABSTRACT

An HCl adsorbent, and method of making and using the adsorbent, the adsorbent comprising an activated alumina promoted with an alkali metal in an amount such that if calculated as alkali metal oxide, the adsorbent contains at least about 5% by weight alkali metal oxide.

4 Claims, 3 Drawing Sheets

HCL ADSORBENT AND METHOD FOR MAKING AND USING SAME

BACKGROUND OF THE INVENTION

1. Field of the Invention

The present invention relates to adsorbents for removing HCl from fluid streams. More particularly, the present invention relates to a promoted alumina adsorbent for removing HCl from fluid streams.

2. Description of the Background

HCl is present as an impurity in numerous industrial fluids, i.e. liquid and gas streams. For example, in reforming processes conducted in refineries, a chlorine promoted catalyst is generally employed. During the reforming operation, which also generates hydrogen, small amounts of gaseous HCl are produced which is carried away with the hydrogen. The hydrogen containing the HCl is generally recycled to the reformer. Accordingly, the small amounts of gaseous HCl present in the recycle hydrogen can seriously interfere with the operation of the process and, in addition, can cause corrosion problems. Additionally, there are other processes in which small amounts of HCl are generated and carried away in gas or liquid streams and which must be removed from such streams to prevent corrosion damage to equipment and avoid environmental problems.

It is well known that activated alumina can act as a scavenger for the removal of small quantities of HCl from fluid streams. For example, U.S. Pat. Nos. 4,630,259 and 4,762,537 both disclose alumina based adsorbents for removing HCl from gas streams. Typically, HCl scavengers made from alumina are formed into nodules, e.g., spheres, the spheres forming a fixed bed through which the gas to be scavenged flows. Handling and use of the nodules dictates that they possess sufficient crush strength to retain structural integrity. It is also known that aluminas impregnated with up to 5% sodium carbonate or sodium hydroxide exhibit improved performance in terms of enhanced hydrogen chloride absorption capacity. This is especially desirable since it means that the user can enjoy longer run times before having to change out the adsorbent, or in the case of new units can design the units smaller. By increasing the content of promoters such as sodium carbonate, or sodium hydroxide, the HCl adsorbing capacity of the scavenger can be increased. However, heretofore, attempts to increase the content of such promoters has resulted in a scavenger which does not possess sufficient structural integrity to be useful in commercial applications.

SUMMARY OF THE INVENTION

It is therefore an object of the present invention to provide an improved scavenger for removing HCl from fluid streams.

Another object of the present invention is to provide an alumina adsorbent for use as an HCl scavenger, the adsorbent having increased HCl removal capacity.

Still a further object of the present invention is to provide a process for removing HCl from fluid streams using alumina based adsorbents which possess excellent structural integrity and enhanced capacity for HCl removal.

Another object of the present invention is to provide a method for making an alumina based adsorbent for use in the removal of HCl from fluid streams.

The above and other objects of the present invention will become apparent from the drawings, the description given herein and the appendent claims.

DESCRIPTION OF THE PREFERRED EMBODIMENTS

Figure 1:
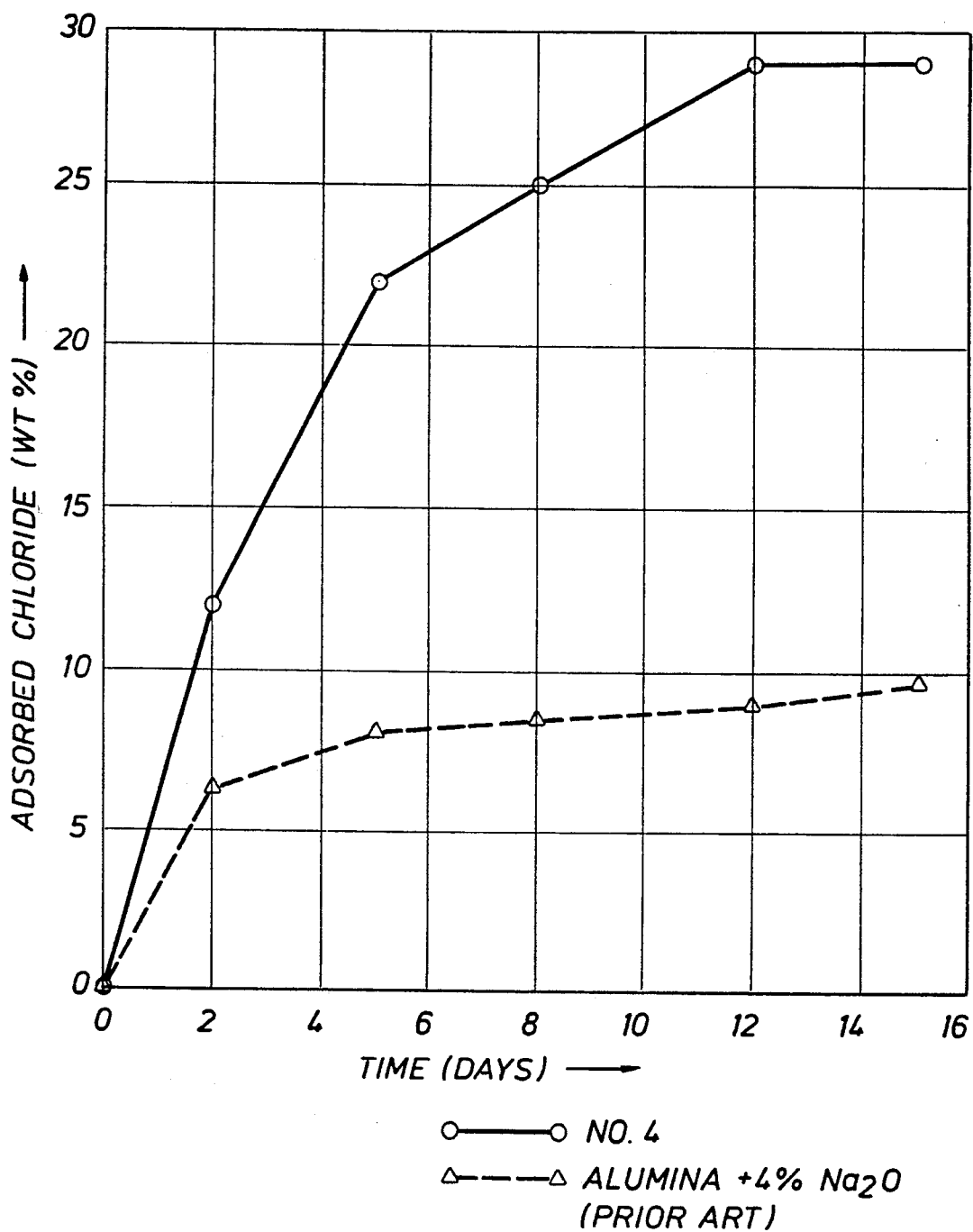
FIG. 1 is a graph showing a comparison of HCl adsorption capacity as between the adsorbent of the present invention and a prior art adsorbent containing sodium oxide derived from sodium hydroxide.

The primary component of the HCl adsorbent of the present invention is an activated alumina. The term "activated alumina" refers to an alumina having an extended surface area of above about 100 m$^2$/g, preferably above about 150 m$^2$/g. Methods for activation of alumina are well known in the art. One technique which has been found to be particularly useful is described in U.S. Pat. No. 2,915,365, incorporated herein by references for all purposes. In a common method of obtaining an activated alumina, an alumina hydrate, e.g. bauxite, is heated at a high temperature generally for a very short period of time in a process known as flash calcination. Typically flash calcination or activation involves temperatures of 400°–1000° C. with contact times of the order of 1 to several seconds, typically about 1 second. During this activation the alumina starting material is converted from a very low surface area hydrate to a high surface area material.

As a starting material to obtain the activated alumina, any number of various aluminas or alumina containing materials can be employed. For example, essentially pure aluminas such as alumina trihydrate, pseudoboehmite, alpha alumina monohydrate can be used. A particularly convenient source of alumina starting material is gibbsite, a form of alumina trihydrate, which is manufactured by the well known Bayer process. This product is readily available commercially and typically has a particle size of 90–100 microns. In addition, the alumina containing material can comprise materials such as bauxite or, indeed, can be other alumina bearing sources such as beneficiated clays. Another useful source of alumina containing materials are aluminas, e.g. boehmite, obtained from the hydrolysis of aluminum alkoxides. In general, the starting material alumina should have a minimum alumina ($Al_2O_3$) content of at least about 40% by weight calculated on the basis of its dry weight, i.e., after ignition at 1000° C. for one hour. The alumina used in the adsorbent must be reduced in size to the 1–10 micron range, either before, or after being flash calcined but in any event before being impregnated with the promoter.

As noted, the activated aluminas used in the present invention will generally possess a surface area in excess of 100 m$^2$/g, preferably in excess of 150 m$^2$/g and more preferably in excess of 200 m$^2$/g, and have a total pore volume in excess of 0.3 cc/g. The loss of ignition (LOI) of the activated alumina is typically 6–10% which contrasts to a loss of ignition of a starting material alumina, e.g., an alumina trihydrate, which is in excess of 30% weight.

In addition to an activated alumina, the HCl scavenger of the present invention comprises a promoter which is an alkali metal, believed to be in the scavenger in the form of an alkali metal oxide, but perhaps present in the absorbent (scavenger) in some other chemically bound manner, e.g., a sodium aluminate. The alkali metal promoter used in the absorbents of the present invention is derived from a water soluble, alkali metal salt of an organic compound which decomposes, i.e., the organic portion of the compound is essentially destroyed or liberated, at temperatures below about 500° C. Thus, the sodium, potassium, lithium, etc., salts of such organic compounds can be employed, the sodium salts of such compounds being preferred. The organic portion of the alkali metal salts which serve as a source of the promoter used in the adsorbents of the present invention can comprise any number of organic moieties, the primary requisite being that the organic moiety is essentially destroyed or liberated from the compound (salt) at temperatures below about 500° C. Typical, non-limiting examples of suitable alkali metal salts which can be employed include carboxylic acid salts, especially the carboxylic acid salts of mono, di- and tribasic carboxylic acids containing from 1–6 carbon atoms. Especially preferred are the monocarboxylic acid salts of alkali metals wherein the carboxylate portion of the salt contains from 1–6 carbon atoms. Suitable such salts include, without limitation, sodium or potassium formate, sodium or potassium acetate, sodium or potassium propionate, sodium or potassium butyrate, etc. Especially preferred are the formates, acetates and propionates of sodium.

The promoter may be incorporated into the alumina by several techniques. The activated alumina and the source of the alkali metal promoter, i.e., the alkali metal salt described above, can be intimately mixed in powder or dry form, and the powder formed, in the presence of water, to the desired shape. Alternately, a viscous slurry of the alumina containing material and the source of the promoter can be extruded and pelletized thereby forming an intimate mixture of the two primary components. In a preferred method of making the scavenger/adsorbent of the present invention, the alumina is formed into an appropriate shape or agglomerate, the source of the promoter being incorporated during the shaping process. For example, by using a rotating pan, well known to those skilled in the art, and spraying in an aqueous solution of the alkali metal salt, nodules of adsorbent in the form of spheres can be formed. In this process using a pan nodulizer, the activated alumina powder is fed into the rotating pan at a steady rate using a constant rate feeder. An aqueous solution of the alkaline metal salt is sprayed onto the alumina powder while it is in the constantly rotating pan. This process steadily turns the alumina powder into spheres which continually grow until they reach the desired size, usually from about 2 to about 4 mm in diameter. While the preferred form of the scavenger are nodules such as spheres, it will be recognized that any shape can be employed. Thus, cylindrically shaped pellets, irregular lumps, or virtually any other shape can be employed. Regardless of the method used to incorporate or impregnate the source of the alkali metal promoter into the alumina, there must be an amount of the alkali metal salt present which, when the adsorbent has been heat treated as described below, the alkali metal will be present in the adsorbent in an amount such that, calculated as alkali metal oxide, the alkali metal oxide content of the adsorbent will be at least about 5% by weight and preferably from about 5–15% by weight based on the weight of alumina (Al$_2$O$_3$).

In cases where the alumina containing material is a hydratable alumina, e.g. bauxite, alumina trihydrate, etc., once the alumina has been activated, it is necessary that after it has been impregnated with the alkali metal salt and shaped into the appropriate form, it must be cured so that the alumina can be rehydrated. It will be understood, in this regard, that there are commercially available aluminas which can be employed as the alumina containing material and which, even after activation, do not require curing, i.e. rehydration. Rehydration of hydratable aluminas is generally an exothermic reaction and usually requires no additional heat. However, if ambient temperature conditions warrant, heat can be added during the curing process so as to maintain the curing temperature of the shaped adsorbent at above about 50° C. and preferably above about 60° C. for a period of time sufficient to rehydrate the alumina. The rehydration/curing process can be conducted is as little as several minutes if carried out under certain conditions. Alternately, the rehydration process can occur for extended periods of time as for example up to 20 hours or longer. It will be understood that in the curing process water must be present to provide the water of hydration. In cases where the shaped adsorbent has been formed by spraying a water solution of the alkali metal salt onto the nodules as they are formed, the requisite water is already present in the shaped material. However, if required, the necessary amount of water for hydration may be supplied by the appropriate addition of water vapor using above ambient pressures if necessary.

In the last step of the method of making the adsorbent, the shaped scavenger, cured if necessary, is heat treated at a temperature of from about 300° to about 555° C., more preferably from about 400° to about 500° C., especially from about 425° to about 480° C. with a residence time of from about 10–60 minutes, preferably from about 20–40 minutes. This heat treating can be accomplished in a standard type of activator well known to those skilled in the art. During this heat treating or activation step, a major portion of the water of rehydration is removed from the scavenger. Additionally, to optimize the physical strength of the scavenger it is desirable, during the heat treating process, to reduce the LOI below about 5% by weight preferably in the range of from about 3% to about 5% by weight.

The adsorbents of the present invention, particularly when made using a hydratable alumina such as gibbsite, are characterized by a pore volume distribution of at least 0.10 cc/g at a pore diameter of 750 Angstroms and greater, of at least 0.35 cc/g at a pore diameter of 40 Angstroms and greater and at least 0.16 cc/g at a pore diameters in the range of from about 10,000 Angstroms to about 100 Angstroms. Additionally, the adsorbents have a crush strength of at least 15 lbs on a 5 mesh sphere.

The activated, promoted alumina adsorbent of the present invention can be readily employed in the removal of HCl from industrial fluid, i.e. both gas and liquid, streams. Generally, in a typical process, the removal of HCl is accomplished by providing a suitable adsorber vessel charged with the adsorbent to form a fixed bed, and the HCl contaminated fluid is conducted through the adsorber, either in a down or in an upflow manner. It has been observed that the best scavenging activity can be achieved by treating such streams containing up to about 1% by volume HCl. Larger quantities of HCl in the streams may cause premature saturation of the scavenger with the possibility of having an undesired early break-through and consequent corrosion and environmental problems. It has been found that the promoted scavenger of the present invention is effective in removing HCl from fluid streams when the level of HCl ranges from less than 1% by volume to less than 1 ppm by weight thus providing an exit fluid of significantly reduced HCl content. Further, it has been found that, even if the HCl contamination of the fluid stream is in the range of from about 2 to about 4 ppm, the scavenger is still capable of reducing the HCl concentration to levels below the 1 ppm limit. The adsorbent of the present invention will also perform effectively in the presence of water, e.g. as vapor, in the gas being purified.

Purification of HCl contaminated fluid streams with the adsorbent of the present invention is generally continued until the fluid exiting from the purifying column is observed to have an HCl content above the desired level. At this stage, the fluid to be purified is conducted into a column filled with fresh promoted adsorbent and the used adsorbent is either discarded or employed for other purposes.

To more fully illustrate the invention, the following non-limiting examples are presented.

EXAMPLE 1

Gibbsite powder was flash calcined at 980° C. for 2 seconds to produce an alumina powder (1–10 microns). The calcined alumina had a surface area of about 290 m$^2$/g. In making the adsorbents, the following general procedure was followed. The powdered, calcined alumina was fed to a pan nodulizer and sprayed with an aqueous solution of the particular salt until the formed nodules reached the desired size, about 3 mm in diameter. The concentration of the aqueous solutions of the various salts were selected so as to achieve various levels of promoter in the final product. In all cases, the formed nodules impregnated with the promoter were cured at 65° C. for 16 hours in an essentially sealed container. Following this curing, the nodules were heated at 450° C. for about 30 minutes.

The adsorbents thus prepared were tested for HCl adsorption, and dry and wet crush strength. For purposes of determining HCl adsorption a column was loaded with the promoted adsorbent through which a nitrogen stream containing 0.1% by volume HCl was passed continuously for 14 days at a rate of about 0.2 liters/min. In each test, the column contained substantially the same amount of adsorbent.

In addition to conducting studies on the adsorbents prepared as above, HCl adsorption data and crush strength measurements were also obtained on a calcium promoted adsorbent made in accordance with the teachings of U.S. Pat. No. 4,639,259 and marketed by LaRoche under the name of A-203Cl. The data is shown in Table 1 below.

TABLE 1

| Adsorbent | Wt. % Cl Adsorbed | Original Crush Strength in lbs | Wet Crush Strength in lbs. |
|---|---|---|---|
| Alumina + sodium carbonate[1] | | | |
| 1. 4.0% Na$_2$O | 13.2 | 31.8 | 18.0 |
| 2. 10.0% Na$_2$O | 18.0 | 9.6 | 5.2 |
| Alumina + sodium acetate[2] | | | |
| 3. 4.0% Na$_2$O | 13.1 | 25.5 | 15.1 |
| 4. 10.0% Na$_2$O | 17.7 | 26.6 | 14.7 |
| 5. A-203 Cl[3] | 12.4 | 15.3 | 8.6 |

Test Conditions: 0.1% HCl in nitrogen for 14 days for adsorption data. Wet crush measured after exposure to 60% relative humidity for 24 hours. Original crush measured on dry sphere. All crushes measured on 5 mesh sphere.
[1]Prior art adsorbents made by spraying 8.0 wt. % solution of Na$_2$CO$_3$ (4.0% Na$_2$O) and 20.0 wt. % solution of Na$_2$CO$_3$ (10.0% Na$_2$O). Pore volume distribution of 0.26 cc/g at a pore diameter of 750 Angstroms or greater, 0.33 cc/g at a pore diameter of 40 Angstroms and greater, and 0.082 cc/g at pore diameters in the range of 10,000 Angstroms to 100 Angstroms.
[2]Adsorbents according to present invention, made by spraying 12.0% solution of sodium acetate (4.0% Na$_2$O) and 30.0 wt % solution of sodium acetate (10.0% Na$_2$O). Pore volume distribution of 0.19 cc/g at a pore diameter of 750 Angstroms and greater, 0.40 cc/g, at a pore diameter of 40 Angstroms and greater, 0.16 cc/g at pore diameters in the range of 10,000 Angstroms to 100 Angstroms.
[3]Adsorbent as per U.S. Pat. No. 4,639,259 (Calcium promoted)

As can be seen from the data above, the prior art adsorbent made with sodium carbonate (No. 2 in Table 1), while showing adequate HCl adsorption over the 14 day period, shows unacceptably low crush strength at the 10% sodium oxide level. Indeed, the crush strength at the 10% sodium oxide level, both wet and dry, is so low as to render the product commercially unusable in typical applications. This is to be contrasted with the adsorbent of the present invention (No. 4 in Table 1) which at the 10% sodium oxide level exhibits excellent crush strength and HCl adsorption capacity. The adsorbent prepared in accordance with U.S. Pat. No. 4,639,259 (No. 5 in Table 1) shows markedly lower HCl adsorption than the adsorbent made according to the present invention. Additionally, it exhibits lower crush strength, both wet and dry, than the adsorbent of the present invention. Note that when the sodium oxide content is at 4% (No. 3 in Table 1), the adsorbent made by the process of the present invention does not show any better HCl adsorption capacity than what is exhibited by the prior art adsorbents.

EXAMPLE 2

Various of the adsorbents utilized in Example 1 were tested for HCl adsorption over an extended 28 day trial. In all cases, the same quantity of adsorbent was employed and a gas stream containing 10 ppm HCl in air at a flow rate of 3.5 liters/min was used. The data are shown in Table 2 below.

TABLE 2

| Adsorbent | Wt. % of HCl adsorbed with time | | | |
|---|---|---|---|---|
| | 7 Days | 14 Days | 21 Days | 28 Days |
| Alumina + sodium acetate | | | | |

TABLE 2-continued

| | Wt. % of HCl adsorbed with time | | | |
|---|---|---|---|---|
| Adsorbent | 7 Days | 14 Days | 21 Days | 28 Days |
| 3. 4.0% Na$_2$O | 2.7 | 6.4 | 7.9 | 9.6 |
| 4. 10.0% Na$_2$O | 3.6 | 7.6 | 11.0 | 13.0 |
| 5. A-203 Cl | 3.1 | 5.6 | 7.5 | 9.4 |

Test Conditions: 10 ppm HCl in nitrogen at 20.8 liters/min for 28 days

As can be seen from the data in Table 2, the adsorbent (No. 4) made according to the process of the present invention, i.e. containing in excess of 5% sodium oxide, shows markedly enhanced HCl adsorption as compared with the prior art product (No. 5) produced according to U.S. Pat. No. 4,639,259 or with an adsorbent containing less than 5% sodium oxide (No. 3).

EXAMPLE 3

Adsorbent (No. 4 from Table 1) was compared with a prior art adsorbent containing alumina and 4% by weight sodium oxide derived from sodium hydroxide over a 15 day period for HCl (chloride) adsorption. The test conditions involved using air containing 100 ppm HCl at a flow rate of 3.5 liters/min. The results are depicted in FIG. 1. As can be seen from FIG. 1, over the 14 day test period, the adsorbent of the present invention (No. 4 from Table 1) shows a markedly greater HCl adsorption capacity as compared with the prior art adsorbent made from alumina and sodium hydroxide.

EXAMPLE 4

Figure 2:
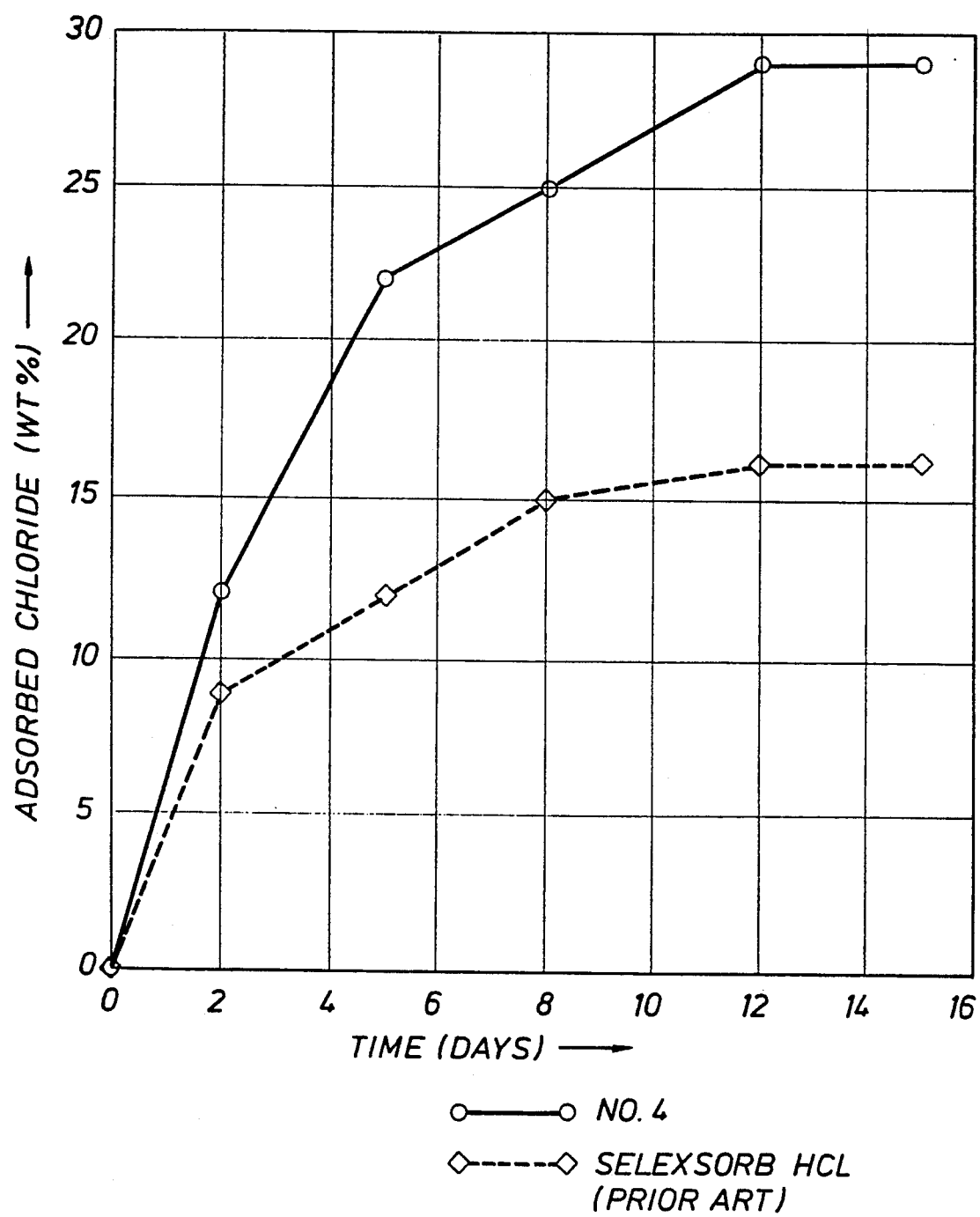
FIG. 2 is a graph similar to FIG. 1 comparing the adsorbent of the present invention with a prior art adsorbent made from alumina and a Y Zeolite.

In this example, the adsorbent of the present invention (No. 4 from Table 1) was compared with a prior art adsorbent made in accordance with the teachings of U.S. Pat. No. 4,762,537, (the adsorbent contains alumina and Y zeolite) and marketed as Selexsorb HCl by Alcoa. HCl adsorption tests on the two adsorbents were conducted as per the procedure of Example 3 with the exception that an air stream containing 1000 ppm HCL was employed at a flow rate of 3.5 liters/min. As can be seen from FIG. 2 the adsorbent of the present invention shows a markedly enhanced ability to remove HCl as compared with the prior art adsorbent made from alumina and Y zeolite.

EXAMPLE 5

Figure 3:
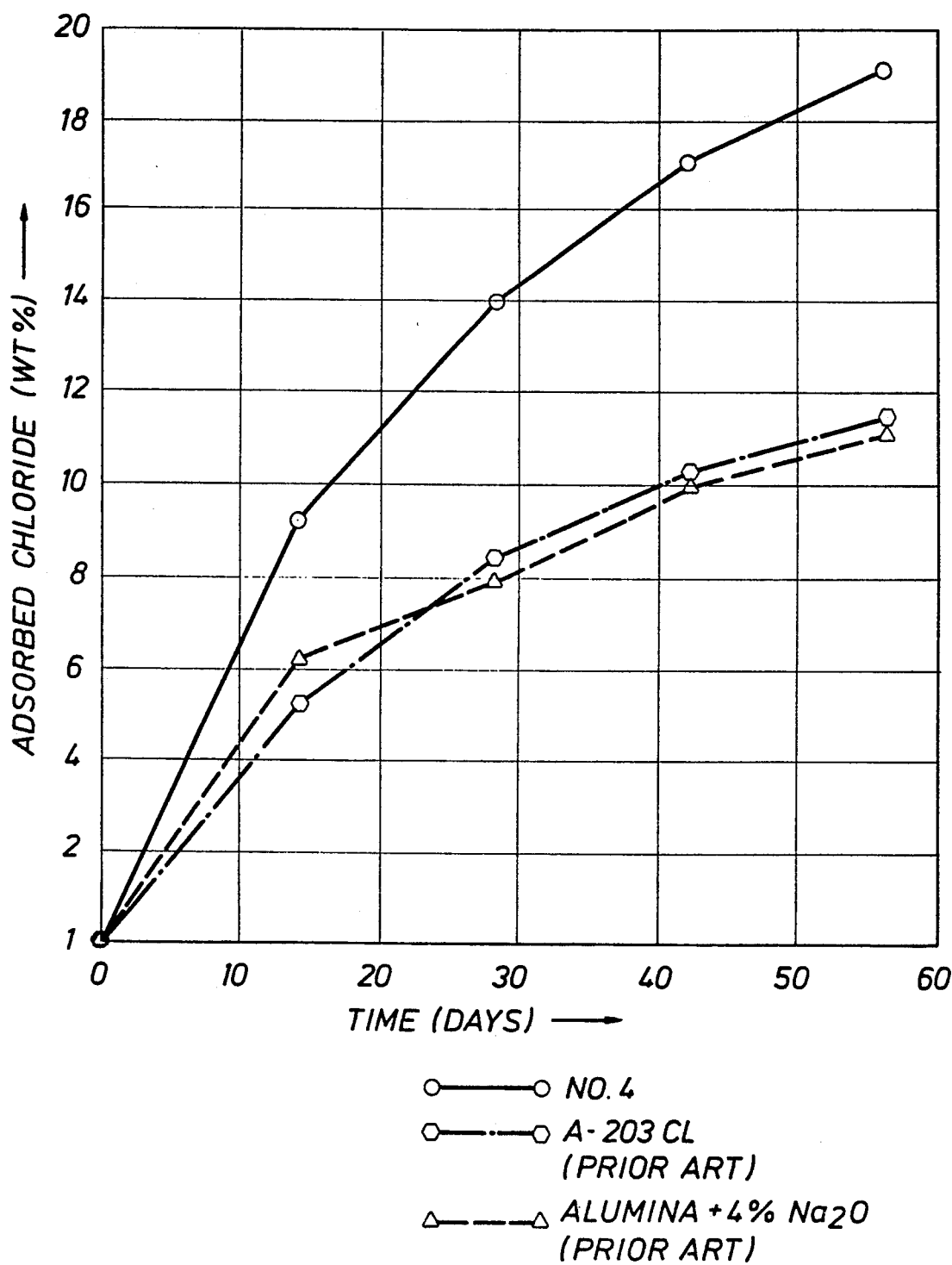
FIG. 3 is a graph similar to FIG. 1 comparing the adsorbent of the present invention with several prior adsorbents.

Using the general procedure of Example 1, adsorbent No. 4 from Table 1, A-203 Cl (No. 5 from Table 1) and the prior art sodium hydroxide doped alumina adsorbent from Example 3 were subjected to a protracted (~50 days) study to determine relative HCl adsorption capacity. The gas used was air containing 10 ppm HCl at a flow rate of 3.5 liters/min. The results are depicted in FIG. 3. As can be seen, over a long time period the adsorbent of the present invention is far superior to the prior art adsorbents using a calcium promoter (A-203 Cl) or promoted with sodium wherein the sodium oxide content of the alumina is less than about 5% by weight and is derived from sodium hydroxide.

As can be seen from the data above, the present invention provides an improved HCl adsorbent with enhanced HCl adsorption capacity as compared with prior art adsorbents. Moreover, the adsorbent of the present invention exhibits acceptable crush strength which is important in commercial applications. This is particularly surprising since, as demonstrated by the data above, prior art attempts to utilize an activated alumina containing a high content, e.g. >5%, of an alkali metal such as sodium results in an adsorbent which exhibits enhanced HCl adsorption capacity (See Table 1, No. 2) but which has unacceptable crush strength rendering it unfit for commercial applications. As can be further seen from FIG. 3, by using the adsorbent of the present invention a user can obtain much longer run times.

While the invention has been demonstrated with respect to gas streams, it will be understood that it is equally applicable to liquid streams which will not deleteriously affect the adsorbent. For example, the adsorbent can be used to remove HCl from liquid hydrocarbons and other organic streams.

What is claimed is:

1. A promoted adsorbent for removing HCl from fluid streams comprising:
   activated alumina, and an alkali metal promoter, said alkali metal promoter being derived from a water soluble, alkali metal salt of a carboxylic acid containing from 1 to 6 carbon atoms heat treated with said alumina at a temperature of about 300° to about 555° C. for about 10–60 minutes and present in an amount such that, if calculated as alkali metal oxide, said adsorbent contains in excess of 5% by weight alkali metal oxide based on the weight of alumina present in said adsorbent, said adsorbent having a pore volume distribution of at least 0.10 cc/g at a pore diameter of 750 Angstroms and greater, of at least 0.35 cc/g at a pore diameter of 40 Angstroms and greater and at least 0.16 cc/g at pore diameters in the range of from about 10,000 Angstroms to about 100 Angstroms, said adsorbent having a crush strength of at least 15 lbs.

2. The adsorbent of claim 1 wherein said alkali metal is sodium.

3. The adsorbent of claim 1 wherein said alumina is present in said adsorbent in an amount of from about 85 to about 95% by weight.

4. The adsorbent of claim 1 wherein said alkali metal oxide is present in an amount of about 10% by weight.

* * * * *